United States Patent [19]
Cohen et al.

[11] Patent Number: 5,805,829
[45] Date of Patent: Sep. 8, 1998

[54] PROCESS FOR RUNNING APPLETS OVER NON-IP NETWORKS

[75] Inventors: Geoffrey Alexander Cohen, Durham; David Louis Kaminsky, Chapel Hill; Richard Adam King, Cary; Matthew Raymond MacKinnon, Durham, all of N.C.

[73] Assignee: International Business Machines Corp, Armonk, N.Y.

[21] Appl. No.: 724,450

[22] Filed: Oct. 1, 1996

[51] Int. Cl.⁶ .................................................. H01D 13/00
[52] U.S. Cl. .............................. 395/200.32; 395/200.59; 395/200.34; 395/200.49
[58] Field of Search ......................... 395/200.32, 200.34, 395/200.33, 200.47, 200.48, 200.49, 200.51, 200.53, 712, 684, 200.59, 187.01

[56] References Cited

U.S. PATENT DOCUMENTS

| | | | |
|---|---|---|---|
| 4,882,674 | 11/1989 | Quint et al. | 395/200.32 |
| 4,891,785 | 1/1990 | Donohoo | 395/200.32 |
| 5,136,716 | 8/1992 | Harvey et al. | 395/200.33 |
| 5,410,651 | 4/1995 | Sekizawa et al. | 395/200.32 |
| 5,440,744 | 8/1995 | Jacobson et al. | 395/200.33 |
| 5,490,271 | 2/1996 | Elliot et al. | 395/200.32 |
| 5,511,167 | 4/1996 | Kawano et al. | 395/200.32 |
| 5,517,622 | 5/1996 | Ivanoff et al. | 395/200.13 |
| 5,524,110 | 6/1996 | Danneels et al. | 395/200.34 |
| 5,537,548 | 7/1996 | Fin et al. | 395/200.32 |
| 5,548,723 | 8/1996 | Pettus | 395/200.33 |
| 5,561,769 | 10/1996 | Kumar et al. | 395/200.32 |
| 5,696,901 | 12/1997 | Konrad | 395/200.32 |
| 5,701,451 | 12/1997 | Rogers et al. | 395/200.32 |
| 5,706,502 | 3/1998 | Foley et al. | 395/682 |

*Primary Examiner*—Nabil Hindi
*Attorney, Agent, or Firm*—Jeanine S. Ray-Yarletts

[57] ABSTRACT

A method and apparatus for allowing applets to be executed natively over a non-IP network. The method and apparatus provide an applet loader that initiates the applet download, services the class faults that are encountered and allows calls to non-IP APIs without compromising the security mechanisms of Java running on TCP/IP. This allows applets to be run without web browsers or web servers.

4 Claims, 5 Drawing Sheets

PROCESS FOR RUNNING APPLETS OVER NON-IP NETWORKS

BACKGROUND OF THE INVENTION

The World Wide Web, also known as "the web", www or "the internet" is a network of computers connected using TCP/IP (Transmission Control Protocol/Internet Protocol) as the transportation mechanism for communicating between the computers. It allows users on one computer to access data on remote computers using programs called web browsers. A web browser is a software application which allows a user to read hypertext. It also allows the user to navigate from one node to another. Netscape Navigator, published by Netscape Communications Corp, is a prominent example of a browser. On the machine containing the information being sought, a web server answers requests from the web browsers. The web server sends the requested web pages to the web browser via the HyperText Transfer Protocol (HTTP).

Initially, the web was limited to static documents, called web pages. Web pages could contain text and images which would be displayed by a web browser, but the pages could not contain computer programs. In 1996, Sun Microsystems introduced Java (Java is a registered trademark of Sun Microsystems), an internet-capable interpreter (also called a Virtual Machine, or VM). With Java, web pages can include programs, called applets. When a browser downloads an applet-containing page, the browser extracts the applet from the page and submits it to the Java virtual machine for execution. Thus, a program or applet can execute on a user's machine without the user explicitly installing it.

While applets gained attention by enabling "live" Web content, such as animations, they also reduce one of the big costs in enterprise computing: client computer installation. A distributed application has two distinct components: a server component and a client component. While the server component need only be installed on one, or a small number of server machines, the client must be installed on every workstation. This can be a very large expense in a corporate distributed computing environment. Using applets, both the client and server components need only be installed on the server. The server component runs on the server computer, and the client component is downloaded from the server computer to the client computers as needed; no explicit client installation is necessary.

However, today's Java applets are limited to IP networks, or require multiprotocol gateways such as IBM's AnyNet to run over non-IP protocols. Java has no native support for SNA, or other non-IP protocols. This is a significant shortfall since many enterprise networks use SNA extensively, especially to connect to mainframe computers that contain much of the world's business data.

OBJECT OF THE INVENTION

It is the object of the present invention to provide a method and apparatus that allows Java applets to be transmitted over non-IP networks such as SNA without the need for a multiprotocol gateway.

It is also the object of this invention to provide a method and apparatus that allows applets transmitted over non-IP networks to connect to servers via non-IP application programming interfaces (APIs) such as the Common Programming Interface for Communications (CPI-C).

It is also the object of this invention to accomplish the above without requiring the use of either a Web server or a Web browser.

BRIEF SUMMARY OF THE INVENTION

The present invention utilizes an "applet loader". The applet loader in the present invention runs on a client computer. It executes three processes that together provide the mechanism for loading applets over non-IP networks: initial applet download, servicing applet "class faults," and allowing calls to non-IP APIs without compromising Java's applet security mechanisms. The client does not need to execute a web browser to complete these tasks.

The server computer utilizes a non-IP file transfer program such as SNA's AFTPD published by the IBM Corporation to transfer the applets from the server to the client. Such programs are well-known in the art. In turn, the server need not execute a web server application.

The applet loader of the present invention prompts the user for the name of the applet that he would like to execute; the loader then accepts the name of the applet. The name, a Universal Resource Locator (URL), implicitly specifies the name of the server. (URLs are well-known in the art). Similar methods of naming the applet and server could be used without materially altering the present invention. The current method is just used as an example. The applet loader then requests that the applet's server computer transfer the first class file comprising the applet. A class file contains the instructions executed by the virtual machine. These instructions are analogous to binary object code and class files are analogous to object files produced by compilers such as a C compiler. By convention, the name of the first class file is the same as the name of the applet with a ".class" extension appended. (E.g., if the applet is called "foo", then the first class file is called "foo.class.") The file transfer is accomplished using a non-IP file transfer, such as SNA's AFTP or IND$FILE or other well-known transfer mechanisms.

The applet loader receives the initial class file, and submits it to the Java virtual machine present on the client computer. This initiates the applet. As the Java virtual machine executes the applet, when it detects that the applet requires classes not present on the client computer (a condition called a "class fault"), the Java virtual machine issues a request to a "class loader", a process within the applet loader, to load a class of a certain name. As above, the class loader issues a non-IP file transfer request to the server computer used to load the initial class file.

This combination of the processes to accomplish initial applet download and class-fault service allow applets to execute over a non-IP network.

To allow applets to call SNA APIs, we must add an additional mechanism to our applet loader. The applet loader must instantiate a Security Manager. In Java, Security Managers are responsible for controlling applet access to local resources. They generally disallow non-Java calls. Because the SNA APIs are not included in Java, this restriction would preclude the use of such APIs.

The applet loader of the present invention instantiates a Security Manager that enforces all of the typical applet restrictions, except that it allows the applet to load the dynamic link library (DLL) containing the Java version of the SNA API. The Security Manager ensures that it allows only this particular DLL to load by comparing the name of each DLL the applet attempts to load to the name of the SNA API DLL, by convention called "javasna.dll." If the DLL is not called "javasna.dll," the Security Manager invokes ("throws" according to Java terminology) a security exception, terminating the applet.

Construction of Java-callable DLLs such as the one allowing access to the SNA APIs is well-known in the art, and is not new to the present invention; allowing applets downloaded over a non-IP transport to call APIs supported by that transport is. While this invention is depicted with respect to the Java virtual machine, it should be obvious to one skilled in the art that the present invention is equally applicable to any virtual machine which supports applets or program launching.

DETAILED DESCRIPTION OF THE PREFERRED EMBODIMENT

The preferred embodiment of the present invention depicts a method and apparatus for loading applets over an SNA network. This invention describes the combination of three processes comprising an applet loader for SNA applets. These processes are: initial applet load, class-fault servicing, and SNA API enablement. These processes are described in detail below.

In the present environment, downloading applets to client computers is inherently an IP task. Web browsers connect to web servers via the HTTP protocol, and the web server downloads Java files (classes) comprising the applet to the client computer, which verifies the Java files, and runs them in the Java virtual machine.

First, an alternative process in which a Java "applet loader" can use alternate file transfer programs capable of loading files, and thus Java programs, over a variety of transports is described. (IP applet loaders are well-known in a Java environment; the present invention pertains to a unique applet loader that does not use IP.) This process requires neither a web browser nor a web server. A similar process is used to service class faults.

Next, a process that extends the Java virtual machine and allows such applets to communicate over a native, non-IP protocol is described. Combined with non-IP applet loading, this technology allows applets to run completely natively over non-IP networks.

Figure 1A:
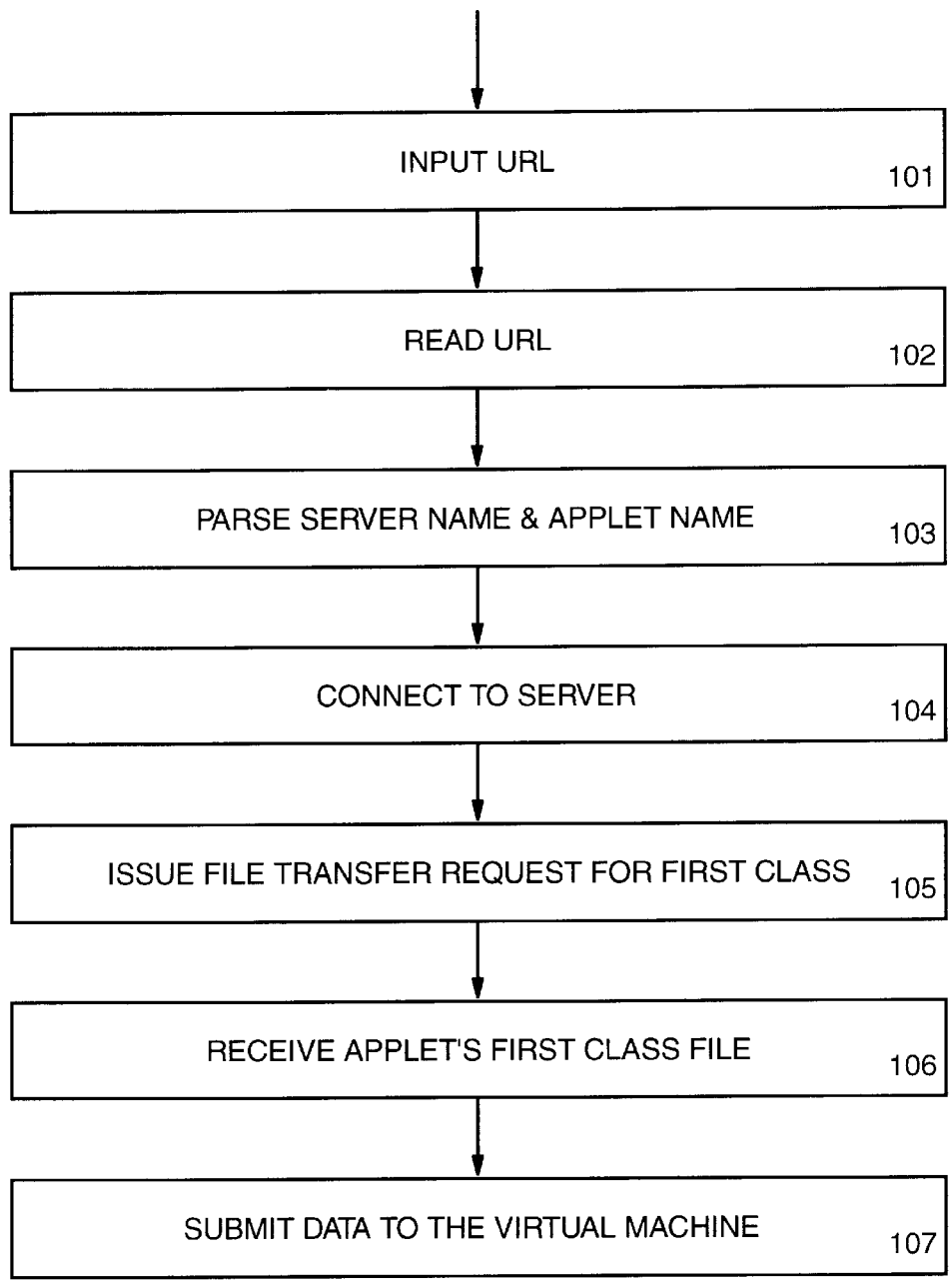
FIG. 1a depicts a flow chart of the steps to load the applet.

As shown in the flow chart of FIG. 1a, an applet loader is used to execute the following processes. First, at 101, the user is prompted for the URL of the desired applet. The application next reads the URL name that is entered by the user 102. This completes the process of gathering the input from the user. The URL is then parsed by the application 103 to separate the server name and the applet name from the information input by the user. Next, a connection is established with the server containing the desired applet 104. This connection is not an IP connection. In the preferred embodiment, it is an SNA connection using LU 6.2 protocol. The preferred embodiment uses ACOPY on the client and AFTPD on the server, both published by IBM. The applet loader establishes the connection by issuing a Java "native call" to ACOPY.

Next the applet loader issues a file transfer request to the server for the applet's first class 105. By convention, the applet's first class has the same name as the applet with ".class" appended to it. Once the server receives the request, it reads the file from the disk and begins to send the requested data. The data comprising the applet's first class file is then received by the requesting application at the client 106. The received data is then submitted to the Java virtual machine 107 using the Java call ClassLoader.defineClass( ). This completes the process of loading the applet.

Figure 1B:
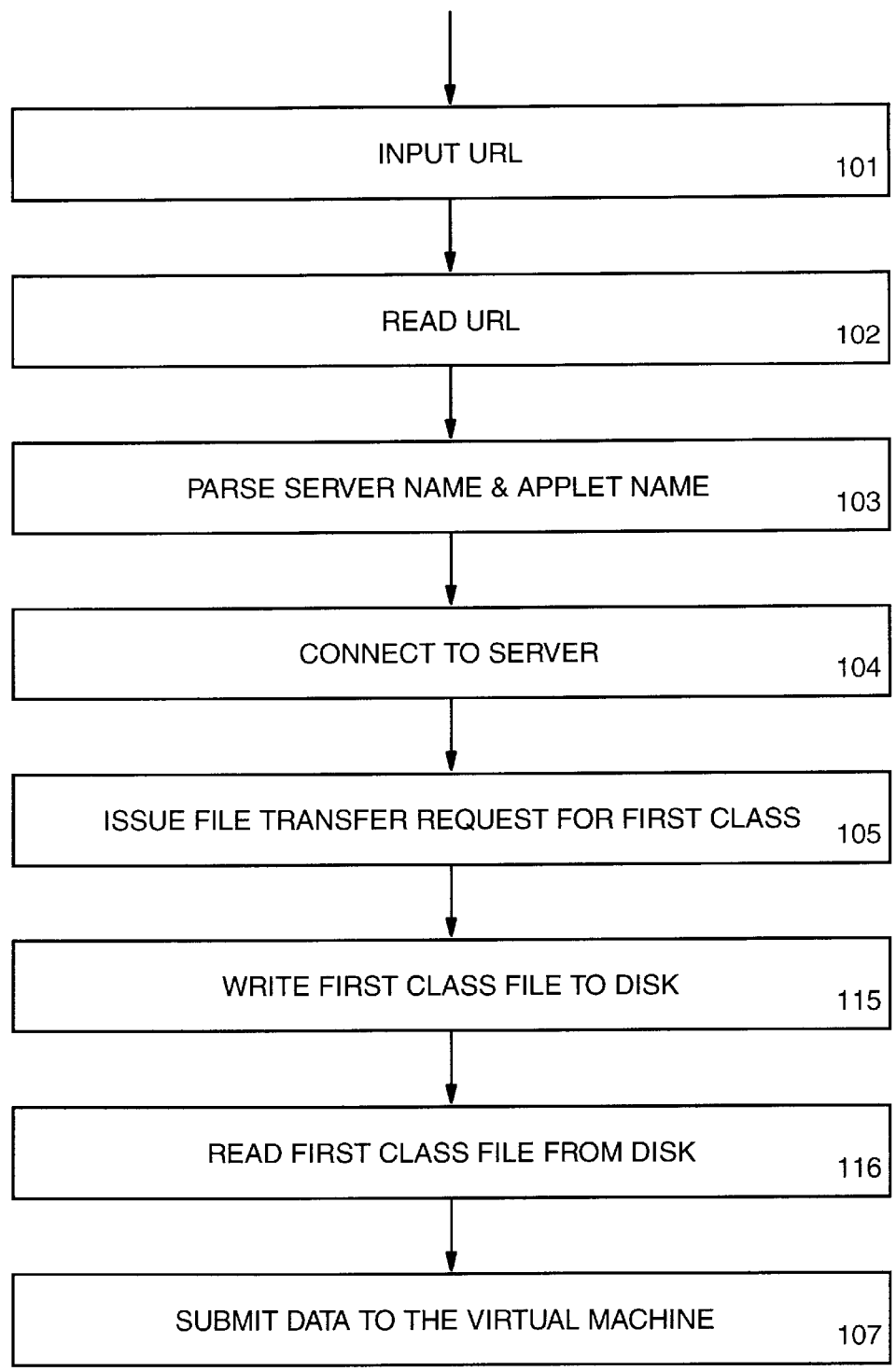
FIG. 1b depicts the steps of FIG. 1a utilizing the ACOPY routine.

In the preferred embodiment, to accomplish the file transfer, ACOPY is used as it is shipped by IBM. As such, ACOPY writes the file that it receives from the server to a local disk, where it is read by the class loader. This requires a minor modification to the process defined in FIG. 1a which is shown in FIG. 1b.

After the applet loader issues a file transfer request for the applet's first class 105, the ACOPY routine writes the applet's first class file to disk 115, then the applet loader reads the file that was just written by ACOPY from of the disk 116. Once the data is read from the disk, the process continues by submitting the data to the Java virtual machine 107.

In an alternate embodiment, ACOPY can easily be modified to return a data buffer containing the Java file to the class loader rather than writing it to disk. This saves the disk write and subsequent read.

In the current applet environment, the above described steps are executed by a web browser, such as Netscape's Navigator, using the web's HTTP protocol run over the TCP/IP transportation protocol. This has disadvantages in large pre-existing enterprise environments, such as:

current applets do not work over SNA networks;

HTTP file transfer is text-based, and thus less efficient than LU6.2;

current applet environments require a web server to be installed on the server, rather than relying on pre-installed file-transfer routines; and current applet environments require a web browser on the client, thus potentially allowing access to browse the entire web hence losing control of the information being accessed by the network owner. Thus, applet loading over SNA has advantages over web-based applet loading.

Figure 2A:
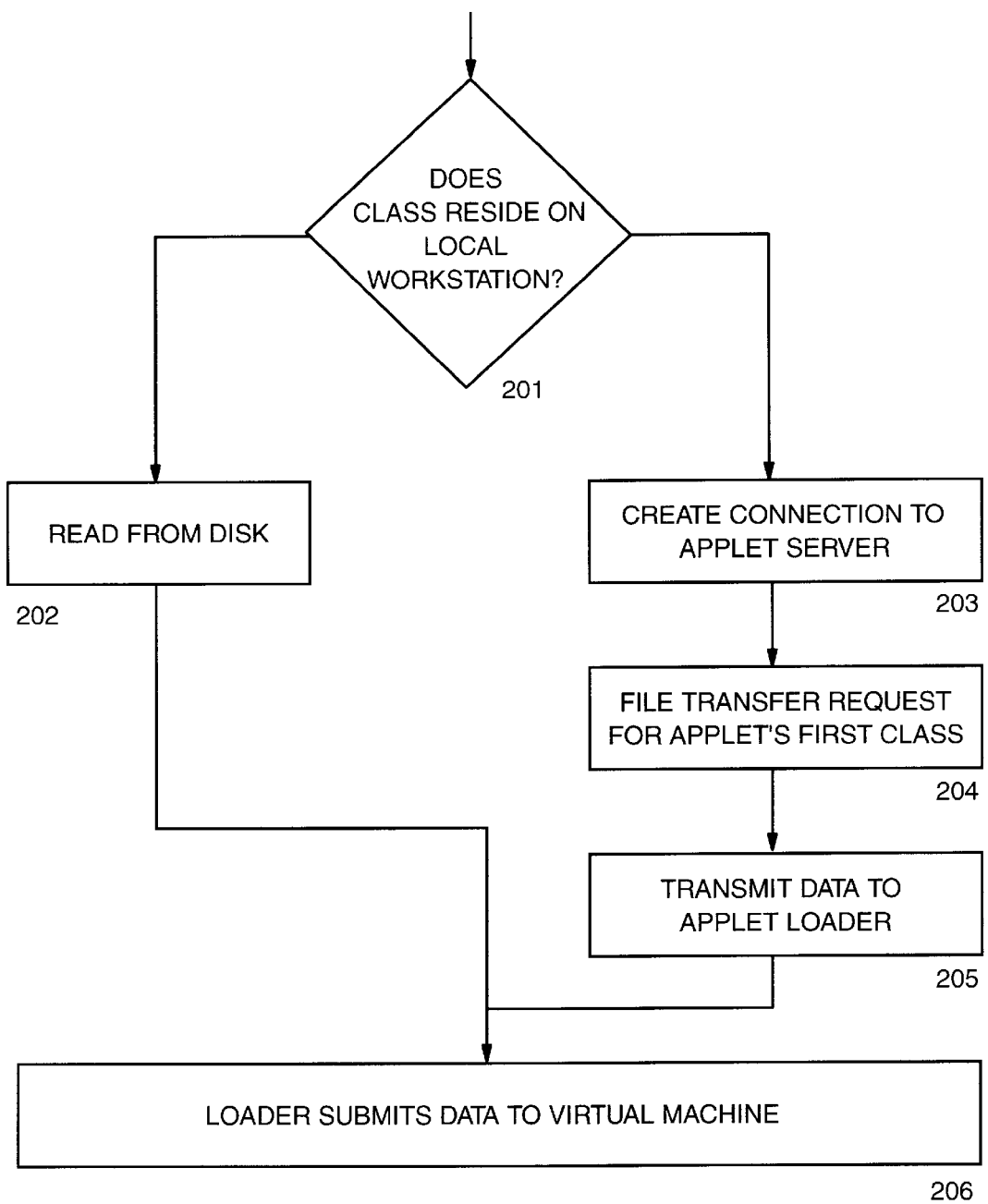
FIG. 2a depicts the class fault processing for the present invention.

Once the applet starts executing, it may request access to a class file that resides on the server, and has not yet been downloaded to the client. This condition is called a "class fault". When a class fault is encountered the virtual machine passes the name of the required class to the applet loader. The applet loader executes the following process to service a class fault over SNA's LU6.2 as is shown in FIG. 2a.

First a test is made to determine if the class resides on the local computer 201, which can occur if the class is stored there or the class loader previously encountered the class and stored it in cache. If the class does reside on the local computer, the information is read from the disk of the local computer 202 or alternatively the class can be cached in memory and read from the cache. If the class does not reside on the local computer, the applet loader creates a connection to the server which contains the applet being sought 203. By convention, the server from which the applet is initially downloaded (that is, from which the applet's first class was loaded) will contain all subsequent class files. The applet loader then issues a file transfer request for the applet's first class 204. The server then transmits the data to the applet loader which receives the data comprising the requested class file 205. Finally, the applet loader submits the transmitted data to the Java virtual machine 206.

Figure 2B:
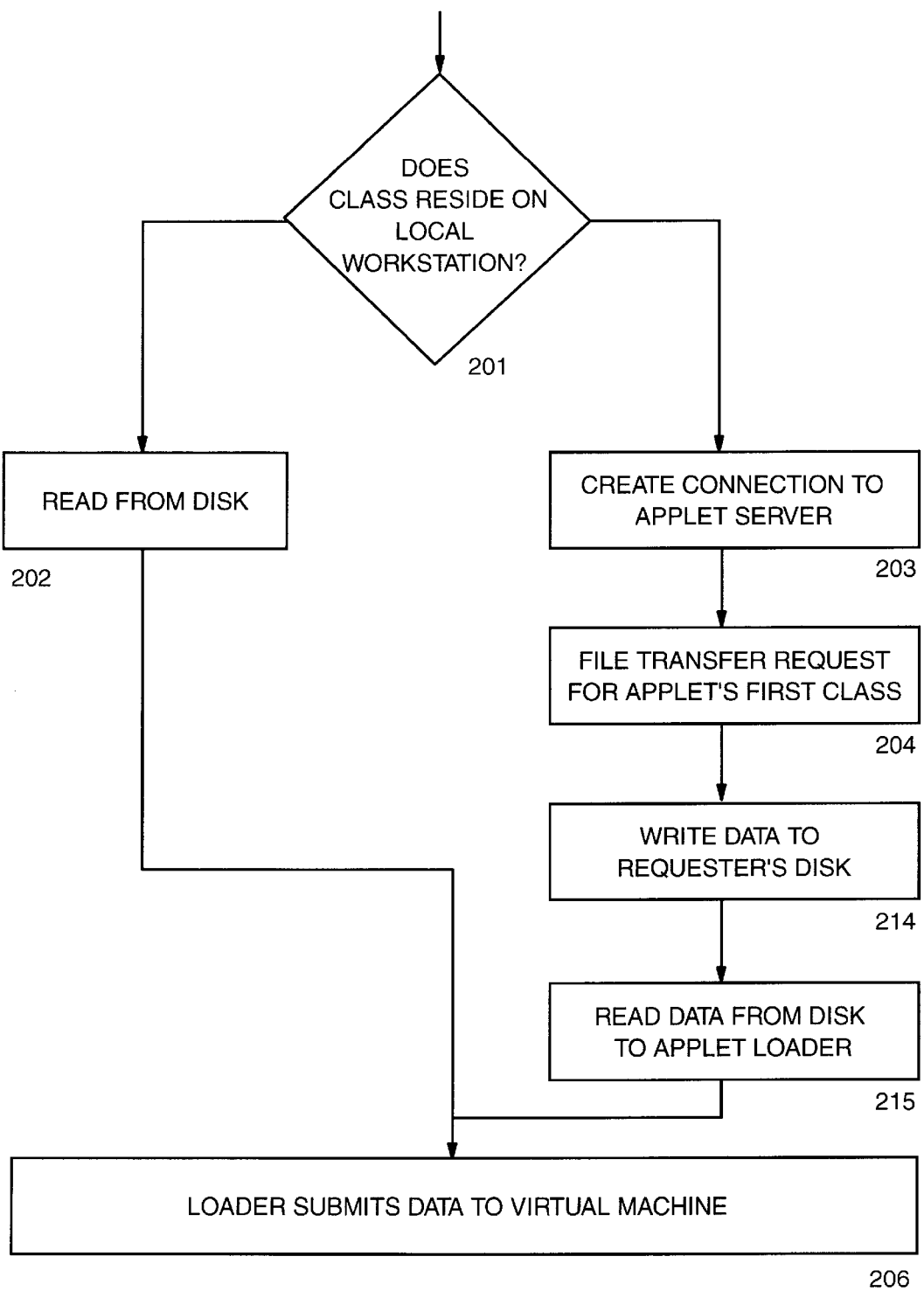
FIG. 2b depicts the class fault processing of FIG. 2a utilizing the ACOPY routine.

As with the description in FIG. 1, if ACOPY is used as it has been in the preferred embodiment the flow is altered as is shown in FIG. 2b. In FIG. 2b, after the applet loader issues the file transfer request for the applet's first class 204, the data satisfying the request is written to disk 214. Then the applet loader reads the class file from disk 215 and proceeds on to submit the data to the Java virtual machine 206.

Again, modifications to ACOPY to store the data in memory will eliminate this disk write and read.

Thus, classes comprising an applet can be loaded over a non-IP network, specifically over LU6.2 utilizing the above described invention. However, given limitations in the current art, that applet can only communicate to a server component over IP using Java's socket API. (The applet can use the sockets API to communicate over LU6.2 using AnyNet, an IBM product; however, the applet loses access to services such as LU6.2's transactional capabilities). It will now be shown how applets can communicate using LU6.2 by way of the present invention.

It's well known in the art that Java applications can make "native" calls to any routine (such as a DLL in OS/2) residing on the local computer. For example, a programmer can write a thin layer on top of the native CPI-C API (published by IBM) that allows Java applications to call the native CPI-C support, such as that included in IBM's OS/2 Communications Manager.

However, applets are not permitted to make such calls: the Java security manager included in web browsers disallow native calls. In the Internet environment where preventing viruses is a prime concern, such a restriction makes sense; in an intranet environment where there are presumably other means of security, it makes less sense, yet this restriction is still unilaterally imposed by the web browsers.

As described above, the process described here includes an applet loader. In Java, a program such as an applet loader can replace the piece of code responsible for applet security. This piece is called the security manager. Since this process is designed for intranets, it is reasonable for the applet loader to require less strict security, especially for applets loaded within the enterprise. Since the applet loader described above uses LU6.2, an enterprise/intranet protocol, it is reasonable to give applets that it loads more freedom to invoke other functions.

Creating a Java-callable library that permits Java code to access SNA APIs is well-known in the art, and is described in IBM technical report TR 29.2168 published Aug. 27, 1996.

Creating a mechanism that allows applets to access the APIs for the non-IP networking protocol over which they were loaded is not known in the art, especially when that access does not compromise security. The present invention includes a mechanism for allowing applets to access to such APIs without compromising the security required for the network.

The applet loading mechanism, described above, is modified to instantiate a security manager object. The applet loading mechanism then requests that the Java virtual machine set the security manager to be the newly instatiated security manager object. The Java virtual machine then uses the instantiated security manager for all security interactions for applets loaded by the applet loader. (Applets loaded by other applet loaders are subject to the security manager of the loader which loaded them.)

Figure 3:
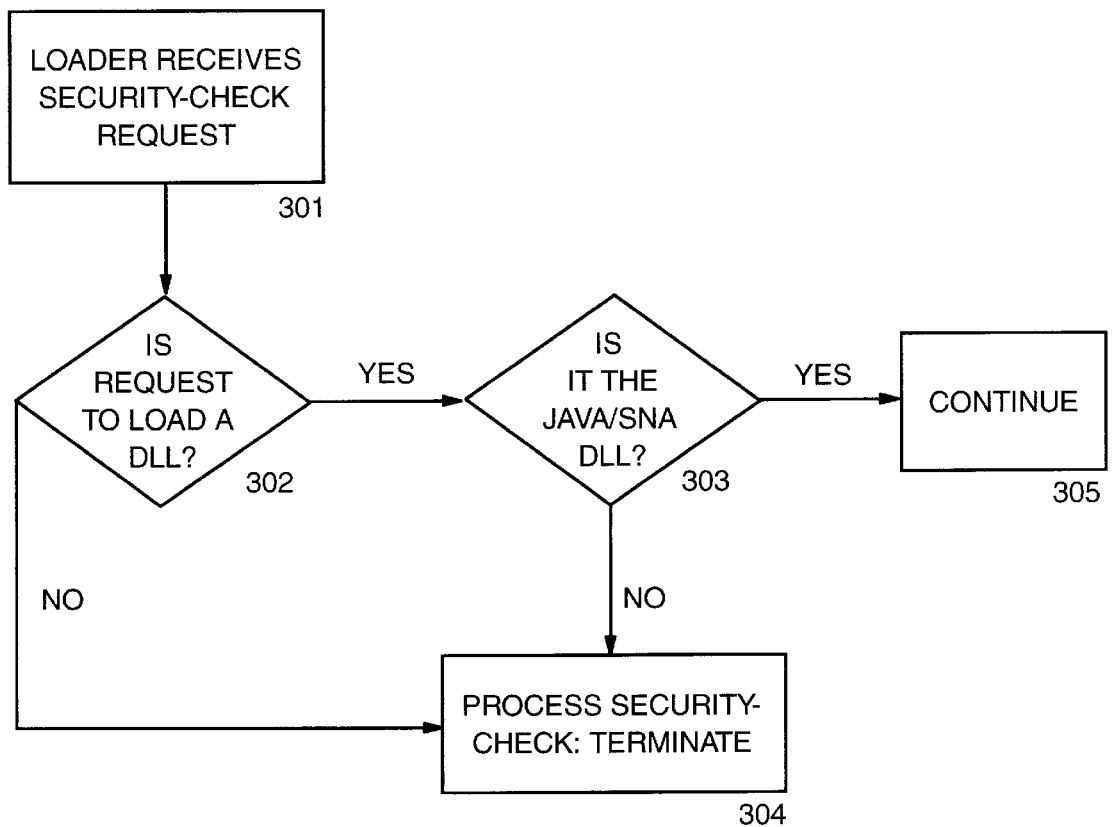
FIG. 3 is a flow chart of the steps for the security mechanism of the present invention.

When an applet executes an operation that might be considered a security breach (trying to access the local disk drive or load a DLL), the Java virtual machine calls the security manager registered for the applet loader that loaded the applet. The security mechanism in this invention executes the following as described in FIG. 3.

First the applet loader accepts the security-check request from the Java virtual machine 301. A test is made to determine if the request is a request to load a DLL 302, the only permissible "violation" for the security manager. If the request is to load a DLL, then a check is made to determine the name of the DLL to be loaded. If the name is that of the Java/SNA API DLL 303 (by convention "javasna.dll") then the security exception is ignored 305 and the process exits, implicitly allowing the action by not terminating the applet. If the request was not a DLL-load request or it was not a request to to load the Java/SNA API DLL then a security exception is processed as usual 304, in effect terminating the applet.

The above mentioned process allows applets to function effectively in a non-IP environment. This has been shown utilizing a preferred embodiment of an SNA LU6.2 network using an AFTP server and an ACOPY client using OS/2 as both the client and the server operating systems. Because LU6.2 has efficiency benefits over IP, and because LU2 and LU6.2 are used by many enterprises, the ability to run applets over these transport protocols is important. It should be evident to one skilled in the art that this invention is not limited to the SNA/LU 6.2 environment. It is applicable to any non-IP environment that it might be advantageous to execute applets.

What is claimed is:

1. A method for executing an applet represented as class files from a computer workstation over a non-IP network, said method comprising the steps of:

a user inputing a name for an applet to be invoked;

parsing a server name and an applet name from the input name;

establishing a connection with said named server if said server is not the workstation from which the user input came;

issuing a file transfer request to said server for a first class file of said applet;

receiving said first class file from said server;

submitting said first class file to a virtual machine, thereby executing said applet;

wherein said applet requires additional class files causing said virtual machine to issue a 'class fault'; and in response to said class fault, said workstation re-establishes a connection with said named server;

issues a file transfer request to said server for said additional class files;

receives said additional class files from said server; and submits said class files to said virtual machine for processing.

2. A method as in either of claim 1 wherein said applet invokes a 'native call', said method further comprising the steps of:

determining if the native call is a request to load a DLL;

if said native call is a request to load a DLL, is the DLL to be loaded for a non-IP protocol API;

if said request is for a non-IP protocol API then satisfy the request, otherwise reject the request.

3. A computer workstation comprising:

a non-IP connection to a computer network;

means for allowing a user to input a name for an applet to be invoked across said non-IP network;

means for parsing said name to identify an applet name and a server name;

means for establishing a non-IP connection to said server parsed from said name if said server is not said computer workstation;

means for issuing a file transfer request to said server for a first class file of said applet parsed from said name;

means for receiving said first class file at said workstation from said server;

means for executing said applet from said workstation across said non-IP network;

means for processing a 'class fault' indicating said applet requires additional class files from said server;

means for re-establishing a non-IP connection to said server;

means for issuing a file transfer request to said server for said additional class files; and means for receiving said additional class files from said server at said workstation.

4. A computer workstation as in either of claim 3, further comprising:

means of intercepting a 'native call' by said applet;

means for determining if said native call is a request to load a DLL;

if said native call is a request to load a DLL, means for determining if said DLL is for a non-IP protocol API;

if said DLL is for a non-IP protocol API, then means to satisfy said request, otherwise rejecting said request.

* * * * *